E. H. SCHMIDT.
COUPLING SHANK AND YOKE CONNECTION.
APPLICATION FILED NOV. 26, 1912.
1,132,980.
Patented Mar. 23, 1915.
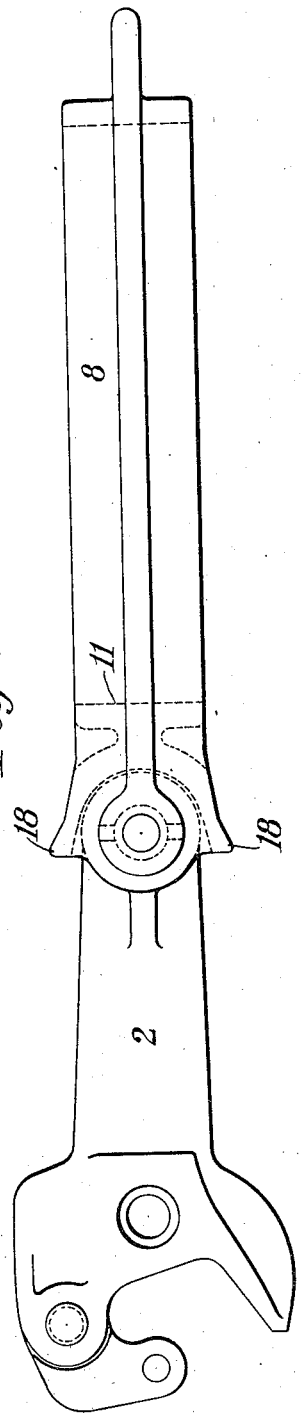
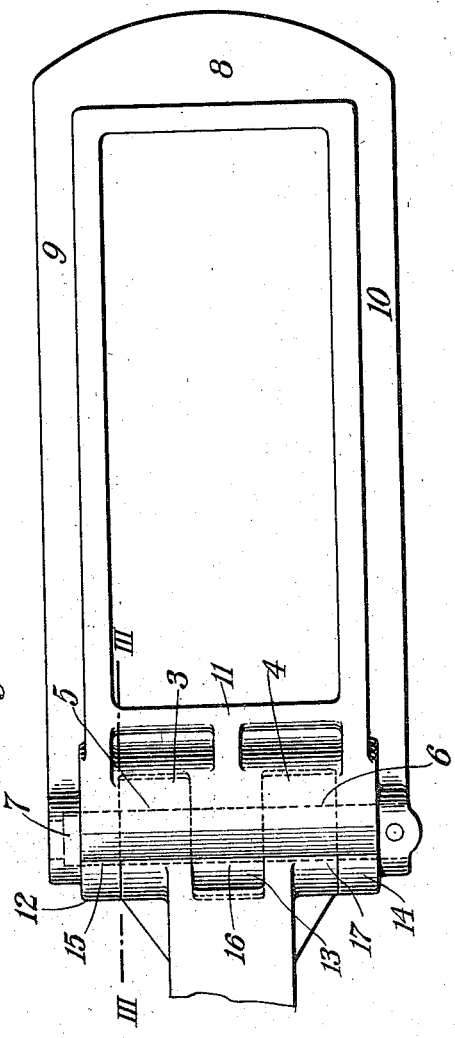
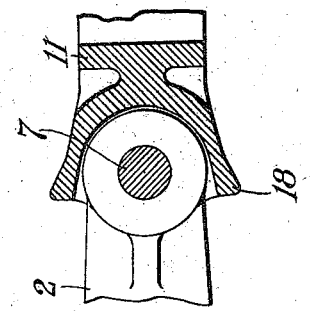
Witnesses:
Inventor
Ernest H. Schmidt
By his Attorney

UNITED STATES PATENT OFFICE.

ERNEST H. SCHMIDT, OF CLEVELAND, OHIO, ASSIGNOR TO NATIONAL MALLEABLE CASTINGS COMPANY, OF CLEVELAND, OHIO.

COUPLING SHANK AND YOKE CONNECTION.

1,132,980.
Specification of Letters Patent.
Patented Mar. 23, 1915.

Application filed November 26, 1910. Serial No. 733,582.

*To all whom it may concern:*

Be it known that I, ERNEST H. SCHMIDT, a citizen of the United States, residing at Cleveland, Cuyahoga county, Ohio, have invented a new and useful Coupler Shank and Yoke Connection, of which the following is a specification, reference being had to the accompanying drawings, in which—

Figure 1 is a plan of my improved device; Fig. 2 is an elevation of the same, and Fig. 3 is a partial section on lines III—III of Fig. 2.

My invention relates to means for connecting coupler shanks of car couplers to draft rigging yokes, and is designed to provide a simple and convenient form of connection by which the parts can be readily disconnected, and which also permits the coupler to angle laterally to the extent provided for in its mounting on the car without throwing any strain either upon the yoke or upon its attachment to the coupler.

My invention also provides a device which prevents the yoke from spreading under the heavy stresses of buffing and draft and at the same time distributes the bending moments on the connecting pin.

Referring to the drawings, the numeral 2 represents the shank of an automatic coupler of any approved type. The shank 2 terminates in the rearwardly-extending lugs 3 and 4, which are provided with registering pin holes 5 and 6 therethrough for the reception of a headless pivot pin 7. The yoke 8, which is preferably an integral steel casting, consists of the usual upper and lower portions 9 and 10 connected at their rear ends, and has a member 11 joining the forward ends of the portions 9 and 10. Extending forwardly of the member 11 are the arms or flanges 12, 13 and 14, which are formed with registering apertures 15, 16 and 17. These flanges 12, 13 and 14 are spaced apart so as to admit into the spaces therebetween the lugs 3 and 4 of the coupler shank 2. Extending forwardly from the member 11 are the reinforcing walls 18, which flare outwardly and extend substantially to the forward end of the yoke, thus providing a structure which permits an angling engagement between the coupler shank and the yoke, and at the same time provides a strengthening of the yoke at the place where the greatest spreading pressure is exerted.

This construction provides a series of bearing surfaces for the pivot pin 7, so that if the pivot pin breaks along any particular line there will still be a number of other complementary bearing surfaces which will prevent the coupler parting from the yoke. In the embodiment shown it will be seen that there must be a quadruple shear of the pin before the parts separate, since, if the pin has broken along the shearing lines between the parts 4 and 14, 4 and 13, and 3 and 13, it will still hold the parts 3 and 12 and prevent separation. It is obvious, therefore, that with the connection described herein, the reinforcement of the yoke by the walls 18 and the alternate bearing of the pin on the complementary lugs and flanges of the coupler shank and the yoke greatly increase its strength and diminish its liability to accident.

What I claim is:

1. In a device of the character described, a yoke strap, a slot between the ends of said strap adapted to receive a coupler extension, an I-shaped brace joining the limbs of said strap, and adapted to engage the coupler extension.

2. A coupler yoke adapted for insertion between the draft sills of a car and comprising an upper and a lower arm, an integral cross piece connecting the rear ends of the arms, and an integral cross piece connecting the arms near their forward ends, flaring reinforcing walls integral with the forward cross piece and with the upper and the lower arms, the said forward ends of the arms and the walls of the forward cross piece comprising a pocket for reception of a bifurcated coupler liner block, an abutment intermediate the forward ends of the arms, integral with the walls of the pocket and the forward cross piece, the said abutment being adapted to seat in the bifurcation of the liner block, and a pivot pin adapted to seat in apertures in the forward ends of the arms, the coupler liner block and the abutment whereby the pivot pin is maintained in quadruple shear.

3. A coupler yoke comprising an upper and a lower arm of T-shape in cross section, an integral cross piece of T-shape in cross section connecting the rear ends of the arms, and an integral cross piece connecting the arms near their forward ends, flaring reinforcing walls integral with the forward cross piece and with the upper and the lower arms, the said forward ends of the arms and the walls of the forward cross piece comprising a pocket for reception of a bifurcated coupler liner block, an abutment intermediate the forward ends of the arms, integral with the walls of the pocket and the forward cross piece, the said abutment being adapted to seat in the bifurcation of the liner block, and a pivot pin adapted to seat in apertures in the forward ends of the arms, the coupler liner block and the abutment, whereby the pivot pin is maintained in quadruple shear.

ERNEST H. SCHMIDT.

Witnesses:
  HARRY E. ORR,
  CHAS. E. POPE.